United States Patent [19]
Raaijmakers et al.

[11] Patent Number: 6,039,074
[45] Date of Patent: Mar. 21, 2000

[54] PRESSURE-INDUCED SHUT-OFF VALVE FOR A LIQUID DELIVERY SYSTEM

[75] Inventors: Ivo J. Raaijmakers, Phoenix, Ariz.;
Chris W. Burkhart, San Jose, Calif.;
David Christensen, San Jose, Calif.;
Michael N. Susoeff, San Jose, Calif.

[73] Assignee: Novellus Systems, Inc., San Jose, Calif.

[21] Appl. No.: 08/926,496

[22] Filed: Sep. 9, 1997

[51] Int. Cl.[7] .......................... F16K 15/18; F16K 31/122
[52] U.S. Cl. .......................... 137/537; 137/511; 251/63.6
[58] Field of Search .......................... 251/331, 62, 63.5, 251/63.6, 63; 137/614.21, 511, 535, 538, 537

[56] References Cited

U.S. PATENT DOCUMENTS

| | | | |
|---|---|---|---|
| 3,077,766 | 2/1963 | Reinecke | 251/331 X |
| 3,477,456 | 11/1969 | Powell | 137/492.5 X |
| 3,729,020 | 4/1973 | Koci et al. | 251/63 X |
| 4,966,188 | 10/1990 | Fischer et al. | 137/492.5 X |
| 5,098,741 | 3/1992 | Nolet et al. | |
| 5,173,033 | 12/1992 | Adahan | 137/854 X |
| 5,425,803 | 6/1995 | Van Schravendijk et al. | 96/6 X |
| 5,755,428 | 5/1998 | Ollivier | 251/331 |

*Primary Examiner*—Kevin Lee
*Attorney, Agent, or Firm*—Skjerven, Morrill MacPherson, Franklin & Friel LLP; David E. Steuber

[57] ABSTRACT

A pressure-induced shut-off valve for a liquid delivery system with a back pressure regulator having a positive shut-off capability is provided. The pressure-induced shut-off valve may incorporate an integrated purge valve or an integrated cross flow nebulizer/vaporizer. The pressure-induced shut-off valve functions as a variable flow restrictor which automatically adjusts itself to provide a constant back pressure in the liquid line.

22 Claims, 8 Drawing Sheets

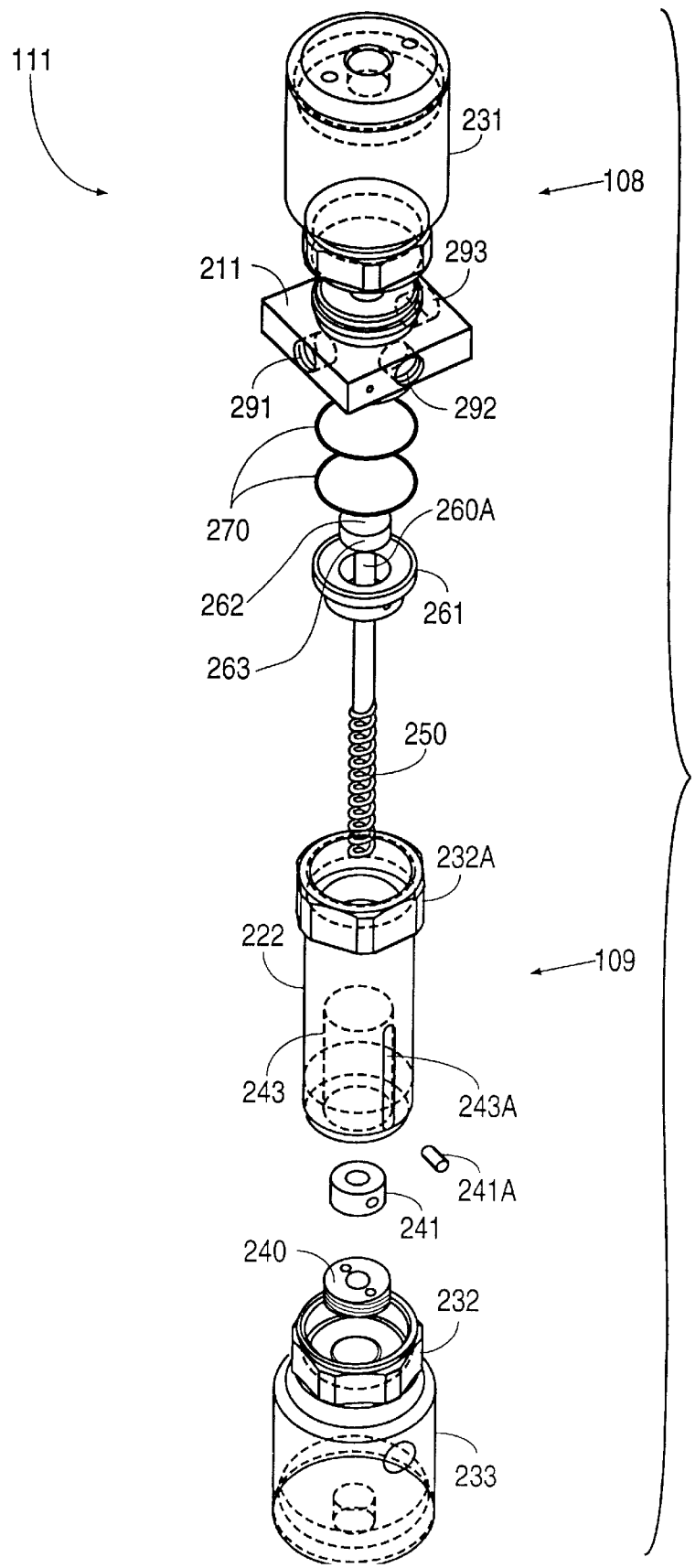

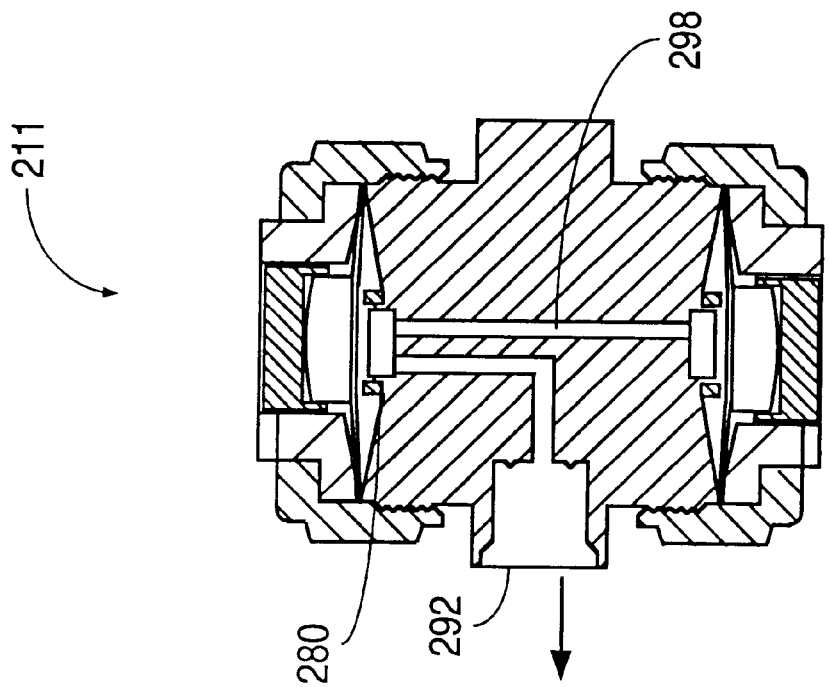
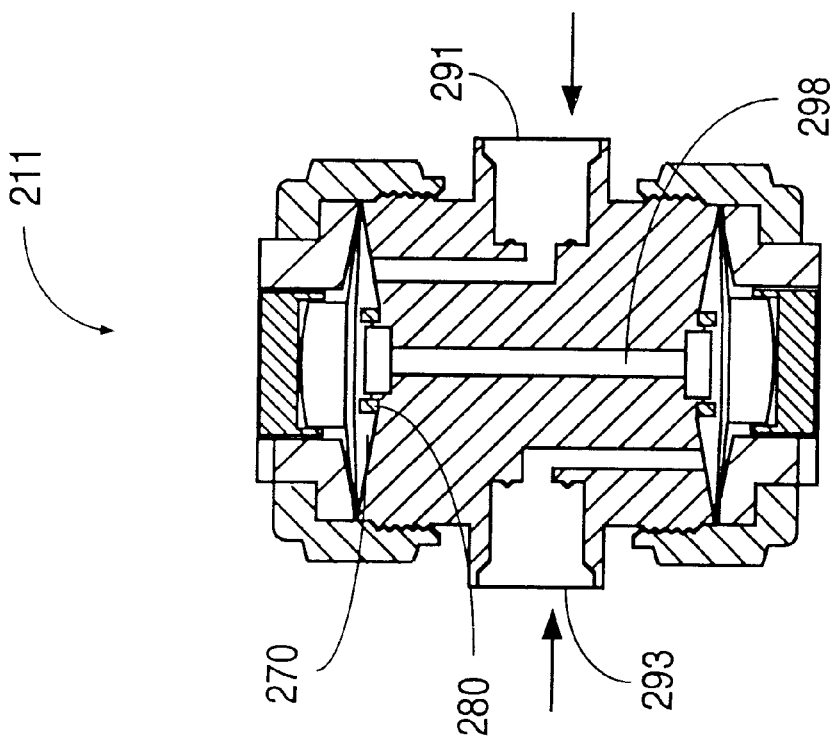

PRESSURE-INDUCED SHUT-OFF VALVE FOR A LIQUID DELIVERY SYSTEM

BACKGROUND OF INVENTION

Low-pressure chemical vapor deposition (LPCVD) reactors are widely used in the manufacture of thin-film devices such as those employed in microelectronic circuitry. The manufacture of such devices frequently depends critically on the thicknesses, compositions, and physical properties of the various thin-film materials. To achieve the needed control of thin film chemical and physical properties, the LPCVD processes by which these multilayer devices are manufactured need to be performed under precise control. Further, in order to minimize waste in industrial LPCVD manufacturing processes, unpredictable run-to-run variations need to be minimized or eliminated. This requires that the LPCVD processes be performed with strict control of the key operating parameters, including, in addition to reactor temperature and pressure, the rates at which the vaporized chemical precursors, oxidants, inert diluents, and other gaseous components are delivered to the chemical reactor.

Precise control of the delivery rates of gaseous oxidants or of inert diluents may be readily achieved by the use of mass flow controllers which are widely available from commercial sources. Also, there are commercially available flow controllers that are designed to deliver various vaporized chemical precursors at controlled rates to the inlet ports of LPCVD reactors. Generally, such chemical precursors are liquids at normal temperatures and pressures. Two distinctly different operations must be carried out to provide for a controlled vapor delivery rate: vaporization and flow control. The order of the operations is not fundamentally important. Hence, a gas flow controller may be employed downstream from a liquid vaporizer, or a vaporizer may be employed downstream of a liquid flow controller. The approach used with a particular precursor liquid is based on consideration of the chemical and physical properties of the material including the vapor pressure curve, the thermal stability of the material, and sensitivity to the presence of impurities.

Cavitation (formation of gas or vapor filled cavities within liquids by mechanical forces) at low mass flow in the liquid feed lines may result in a poorly controlled mass flow. In order to prevent cavitation of the liquid in the liquid feed lines, a flow restriction is often used to provide sufficient back pressure in the liquid feed lines. A shut-off valve is usually separate from and upstream of the restrictor. A purge line and purge valve are usually installed downstream of the flow restrictor to allow purging of the system. This configuration presents several disadvantages. First, for small liquid flows the restrictor must be a very narrow (typically from 0.005" to 0.040" inner diameter) and long (several inches) tube, which is extremely susceptible to clogging when water sensitive or hydrocarbon reactive liquids are used. Second, the pressure drop over the restrictor is a function of mass flow, which means individual restrictor optimization is required for each different mass flow. Third, the volume of liquid in the shut-off valve, the restrictor, and in the tubing/fittings between these components can still evaporate after closure of the shut-off valve, dramatically increasing the response time of the liquid delivery system. Fourth, cavitation may occur in the restrictor or shut-off valve during transients when the flow is very low which results in poor repeatability of the mass flow in non steady state situations such as precursor shut-off during wafer transfer in a single wafer LPCVD reactor. Finally, the separate placement of a purge valve generally results in a dead zone resulting in inadequate purging in a portion of the liquid line.

SUMMARY OF INVENTION

In accordance with this invention, a pressure-induced shut-off valve for a liquid delivery system has a back pressure regulator integrated with a positive shut-off capability. One embodiment in accordance with this invention additionally integrates a purge valve into a back pressure regulator while another embodiment in accordance with this invention alternatively integrates a cross flow nebulizer/vaporizer into a back pressure regulator. The back pressure regulator functions as a variable flow restrictor which automatically adjusts itself to provide a constant back pressure in the liquid line, almost independent of flow rate and physical properties of the precursor liquid. Integration of a positive shut-off capability and a nebulizer/vaporizer reduces the internal volume of liquid contained in the space between the pressure-induced shut-off valve and the vaporizer and thus reduces the response time of the mass flow in the reactor to changes in the set point of the liquid flow controller (LFC). The integration of a purge valve into the pressure-induced shut-off valve eliminates dead zone problems in the liquid feed line and allows a complete purge of the normally dead volume under the seat of the liquid valve.

The fast response time of the system allows one to switch rapidly between different chemistries. Several liquid delivery systems can be connected in parallel to control the flow of different liquids into the reactor simultaneously.

BRIEF DESCRIPTION OF THE DRAWINGS

FIG. 2D shows an exploded view of a pressure-induced shut-off valve in accordance with another embodiment of this invention.

FIGS. 2E and 2F show two side views of a valve body for a pressure-induced shut-off valve in accordance with one embodiment of this invention.

DETAILED DESCRIPTION

Figure 1A:
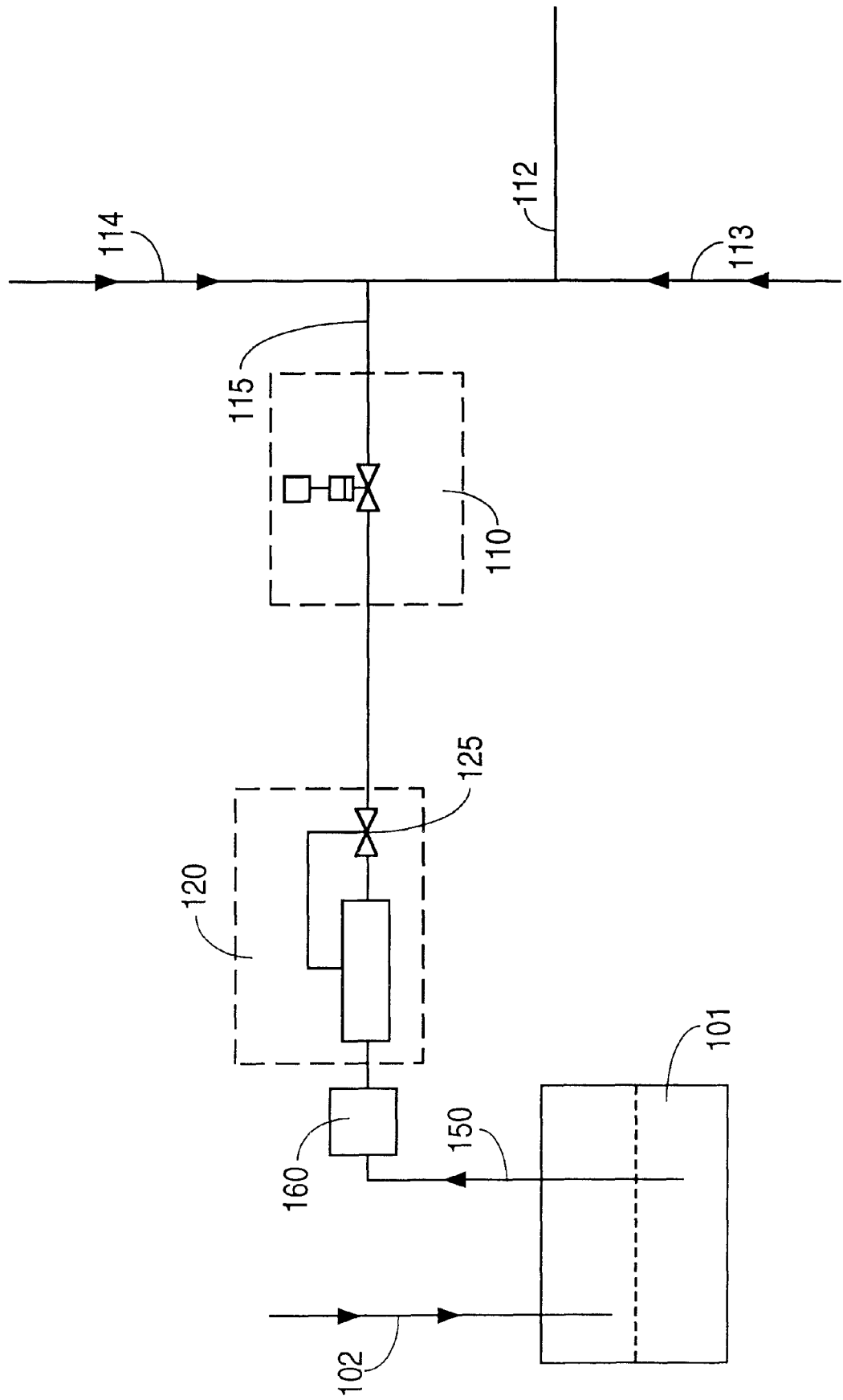
FIG. 1A shows a liquid delivery system in accordance with one embodiment of this invention.

In accordance with the present invention a pressure-induced shut-off valve for a liquid delivery system is used to introduce small mass flows into a chemical reactor. FIG. 1A shows one embodiment of a pressure-induced shut-off valve for a liquid delivery system in accordance with this invention. A liquid is contained in canister 101 that is pressurized by an inert gas, helium, for example, entering on line 102. The pressure in canister 101 pushes the liquid up dip tube 150, through degas module 160, then through conventional liquid mass flow controller (LFC) 120, and then through pressure-induced shut-off valve 110. A cross flow nebulizer/vaporizer and positive shut-off capability are integrated with pressure-induced shut-off valve 110.

Degas module 160 allows removal of the gas dissolved in the liquid due to pressurization in canister 101. Dissolved gas in the liquid can lead to control instability in LFC 120.

A detailed description of a preferred degas module 160 and its operation is given in U.S. Pat. No. 5,425,803 to van Schravendijk et al. which is hereby incorporated by reference.

Pressure-induced shut-off valve 110 maintains a constant pressure in the liquid feed line between valve 125 and pressure-induced shut-off valve 110. The constant pressure in canister 101 and the constant pressure in the liquid feed lines downstream of LFC variable control valve 125 ensure a constant pressure drop across LFC variable control valve 125, almost independent of the liquid flow through the liquid delivery system. The constant pressure in the lines upstream of pressure-induced shut-off valve 110 is kept at a value higher than the pressure at which cavitation would occur. This pressure depends in part on the vapor pressure of the liquid, the amount of dissolved gas, and the solubility of the gas in the liquid at the temperature prevailing in the line. The mass flow into the chemical reactor (not shown) can be controlled accurately by controlling the flow with LFC variable control valve 125. Carrier gas in line 114 mixes with vapor from line 115 before entering the reactor (not shown) on line 112. Carrier gas and vapor from a parallel delivery system in line 113 also enter the reactor (not shown) on line 112.

As further described below, integration of a back pressure regulating device with a positive shut-off capability and a nebulizer/vaporizer allows reduction of the amount of liquid contained in the volume between the shut-off valve and the nebulizer/vaporizer, thus reducing the response time of the mass flow in the chemical reactor to set point changes in LFC 120. Hence, a single wafer LPCVD precursor flow can be shut off rather than diverted between wafer transfers resulting in a significant reduction in the amount of material used per wafer. Several liquid delivery systems can be connected in parallel to control the flow of different liquid chemicals to the chemical reactor simultaneously. Switching between different chemistries may be done quickly because of the rapid response time of the liquid delivery system.

Figure 1B:
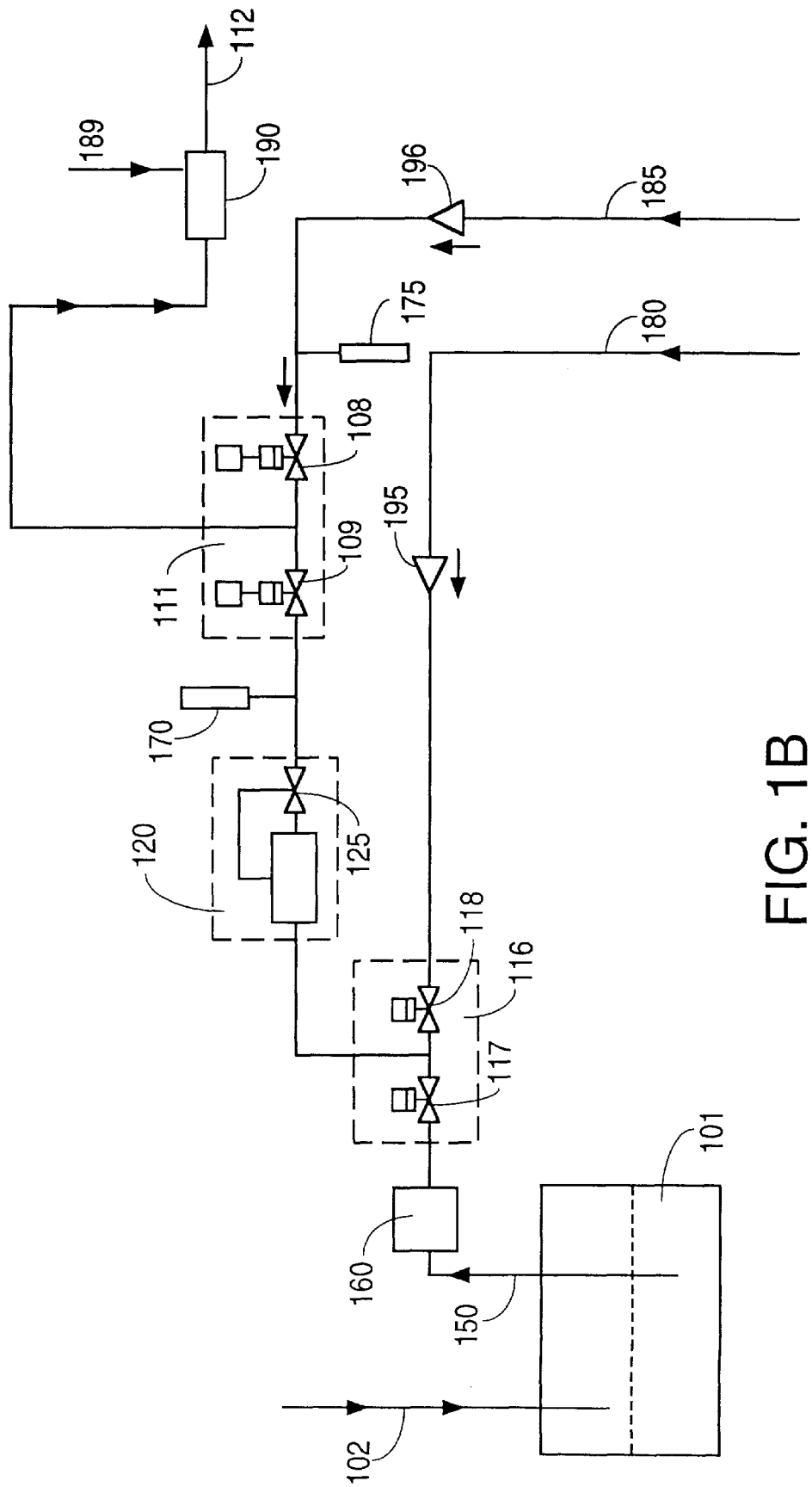
FIG. 1B shows a liquid delivery system in accordance with another embodiment of this invention.

FIG. 1B shows another embodiment in accordance with this invention. Pressure-induced shut-off valve 111 has an integrated positive shut-off capability and an integrated purge valve. Integration of a purge valve with a back pressure regulator results in a near zero dead volume liquid valve. All areas in a near zero dead volume valve, including the valve seat, may be efficiently purged. In the embodiment shown in FIG. 1B, a nebulizer/vaporizer is not integrated into pressure-induced shut off valve 111 but is positioned externally as evaporator 190.

Pressure-induced shut-off valve 111 includes a two head monoblock valve with one of the two heads functioning as a purge valve. Line 185 supplies an inert gas, for example, nitrogen, to purge pressure-induced shut-off valve 111 while line 180 purges the remainder of the liquid delivery system. Two head monoblock valve 116 functions to allow either the flow of liquid from liquid outlet 150 into liquid mass flow controller (LFC) 120 or gas flow from line 180 into liquid mass flow controller (LFC) 120 for purging. Pressure transducer 170 monitors the liquid pressure to assure that the line pressure is significantly larger than the pressure downstream of pressure-induced shut-off valve 111, indicating proper operation of pressure-induced shut-off valve 111.

The system shown in FIG. 1B functions as follows. During operation, helium pressurized at about 40 psi is introduced via dip tube 102 into canister 101 forcing the liquid, for example, TDEAT (Ti($NC_2H_6$)$_4$; tetrakis (diethylamino)titanium, up dip tube 150 through degas module 160. In two head monoblock valve 116, inlet valve 117 is open while purge valve 118 is closed to provide liquid flow through LFC 120 into pressure-induced shut-off valve 111. Purge valve 108 of pressure-induced shut-off valve 111 is closed while valve 109 of pressure-induced shut-off valve 111 is open to provide liquid flow to evaporator 190. A carrier gas enters evaporator 190 to transfer the vaporized liquid into the chemical reactor (not shown) on line 112.

Purging during replacement of LFC 120 involves closing inlet valve 117 and opening purge valve 118 to allow a purge gas such as nitrogen to enter via line 180 into lines upstream of LFC module 120. Additionally, purge valve 108 of pressure-induced shut-off valve 111 is closed and valve 109 of pressure-induced shut-off valve 111 is open so that the purge gas flows into the chemical reactor (not shown) on line 112. A process purge is carried out by closing inlet valve 117, closing valve 109, opening purge valve 108 to allow flow of the purge gas on line 185 into pressure-induced shut-off valve 111 and into the chemical reactor on line 112. Purge valve 118 is also closed during process purging. Check valves 195 and 196 function to prevent backflow in lines 180 and 185, respectively.

In one group of embodiments, two head monoblock valve 116 (available from Nupro, 4800 East 345th Street, Willoughby, Ohio 44094, part no. 6LV-DD6625-DU-AA) is modified to create various embodiments in accordance with this invention, such as for example, pressure-induced shut-off valves 110 and 111 shown in FIGS. 1A and 1B. The structure of pressure-induced shut-off valves 110 and 111 is detailed in FIGS. 2C and 2D, respectively, discussed below.

Figure 2A:
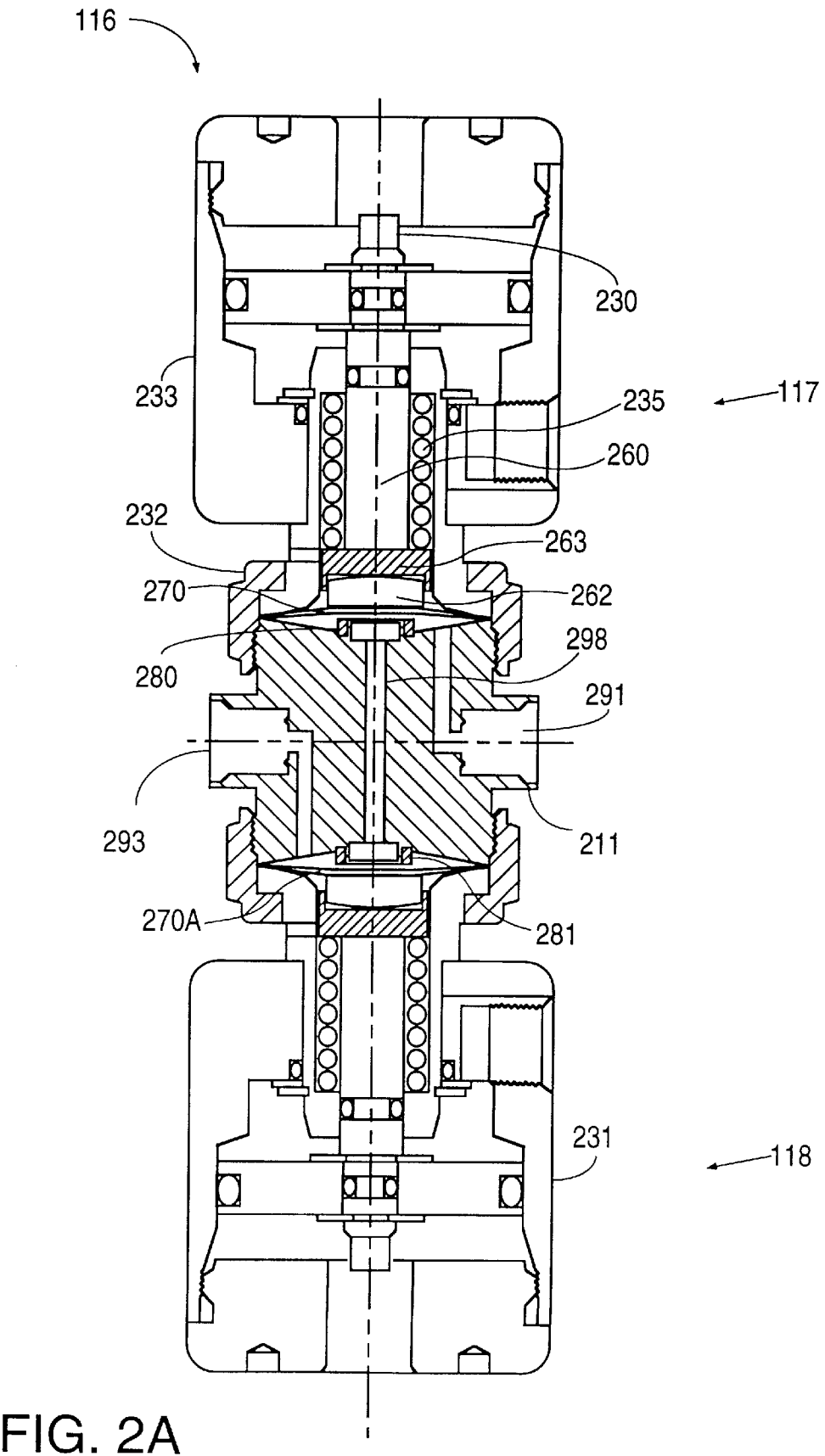
FIGS. 2A and 2B show a two head monoblock valve.
Figure 2B:
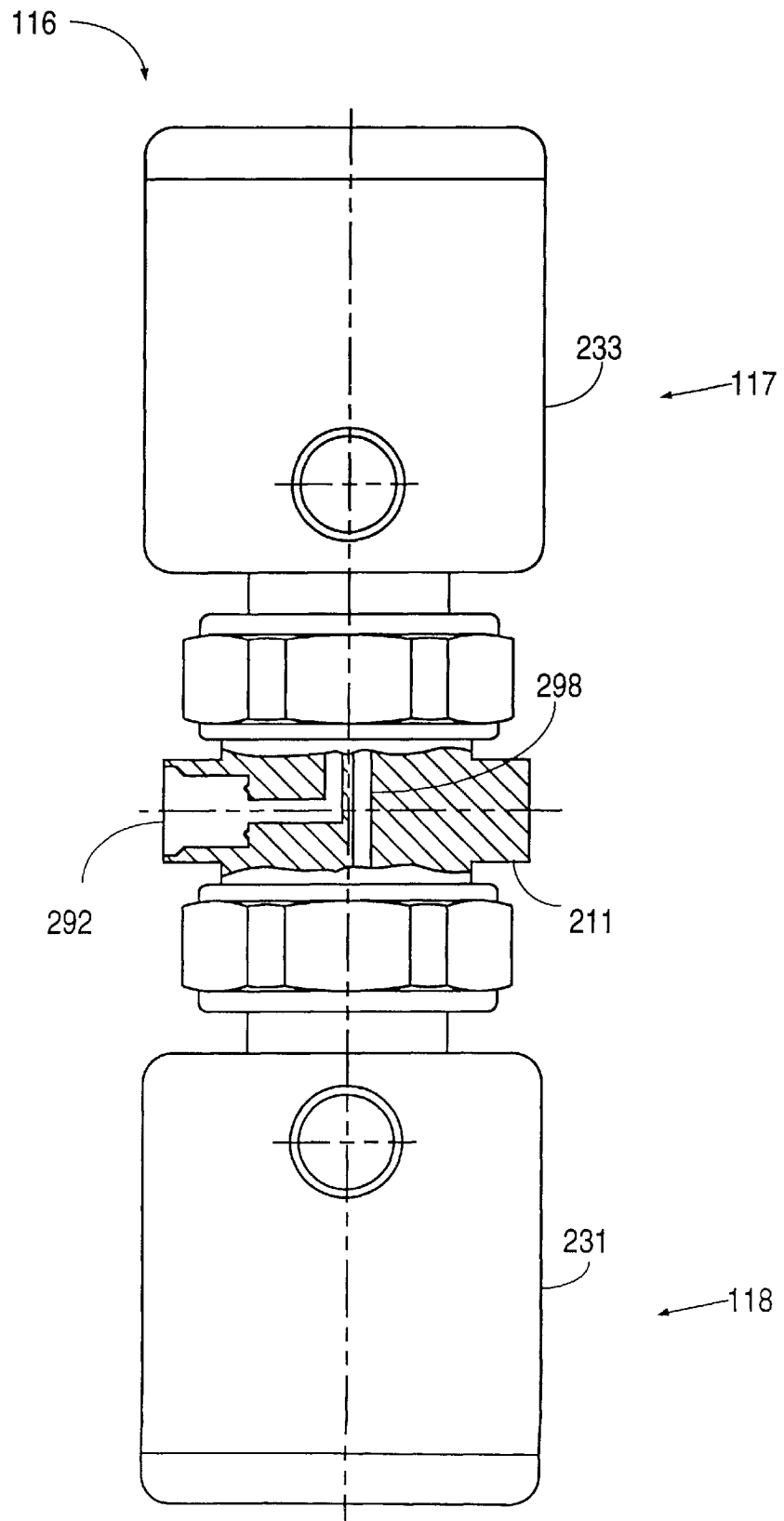

FIGS. 2A and 2B show detailed views of two head monoblock valve 116 containing symmetrical valves 117 and 118. The view of FIG. 2B shows a 90° rotation about the vertical symmetry axis of the view shown in FIG. 2A. FIG. 2E and FIG. 2F show the valve body with the views of FIG. 2A and FIG. 2B, respectively. Two head monoblock valve 116 includes in valve 117: air actuator piston 230, plunger 260, cup 263, button 262, double diaphragm 270, and liquid valve seat 280. Cup 263 is attached to one end of plunger 260 and plunger 260 is coupled to piston 230. When air actuator piston 230 is in the "down" position, compressed spring 235 exerts a downward force on cup 263 containing button 262. Button 262 pushes double diaphragm 270 against seat 280 to close off flow. If air actuator piston 230 is in the "up position", plunger 260 is raised against the force exerted by compressed spring 235. Now, plunger 260 does not push on button 262 and double diaphragm 270 does not press against seat 280, allowing flow past seat 280. Valve 118 is similar to valve 117 and contains double diaphragm 270A which contacts valve seat 281.

Two head monoblock valve 116 also incorporates two inlet ports 293 and 291 upstream of liquid seat 280 and seat 281, respectively, and outlet port 292 (see FIG. 2B) downstream of liquid seat 280. The designations of "upstream" and "downstream" are flow dependent and designations are reversed if the flow direction is reversed. Seat-to-seat communication line 298 in two head monoblock valve 116 allows the gas to fully purge liquid seat 280 and all areas downstream of liquid seat 280.

Figure 2C:
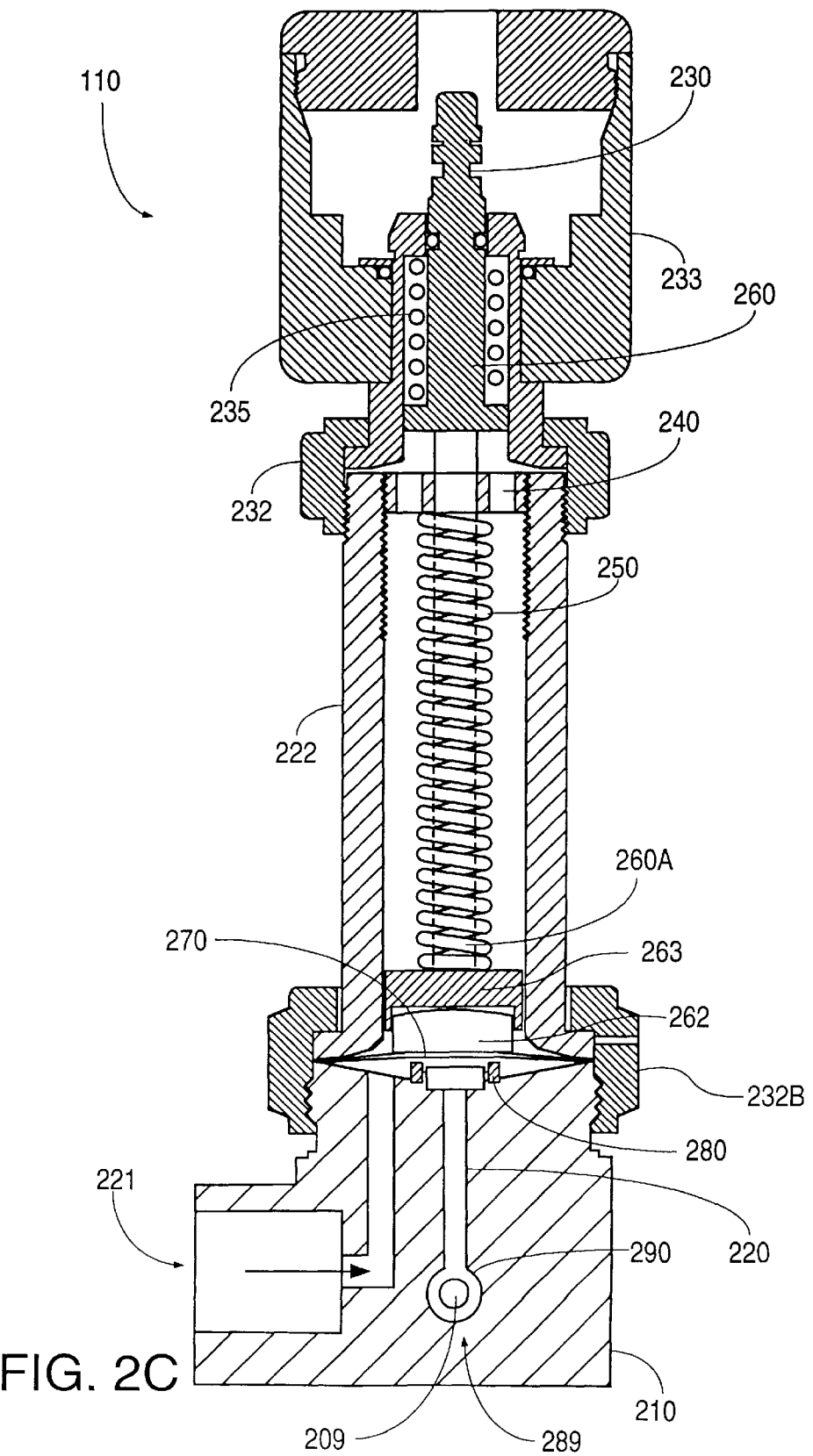
FIG. 2C shows a pressure-induced shut-off valve in accordance with one embodiment of this invention.

FIG. 2C shows an embodiment of a pressure-induced shut-off valve 110 in accordance with this invention. Pressure-induced shut-off valve 110 is a modification of two head monoblock valve 116 that utilizes only one head of two head monoblock valve 116 and does not include an integrated purge valve. Metal casing 222 houses plunger 260A and spring 250. The lower surface of plunger 260 presses against but is not attached to the upper end of plunger 260A. Plunger 260A has cup 263 attached at one end. Cup 263 contains button 262 which contacts double diaphragm 270. In one embodiment in accordance with this invention, spring 250 is made of stainless steel with a spring constant of 4.92 newtons/mm and a free-length of 50.8 mm. The outer diameter of spring 250 is 7.62 mm and the wire diameter is 1.24 mm. Metal casing 222 is threaded at both ends to attach via bonnet nuts 232 and 232B to air actuator 233 and to valve body 210, respectively. Part of the interior of metal casing 222 is threaded to accommodate externally threaded set screw 240 which allows adjustment of the compression of spring 250. It will be apparent to those skilled in the art, that an anti-rotation guide may be added between threaded set screw 240 and spring 250 if desired.

Pressure-induced shut-off valve 110 operates as follows. Liquid flow enters pressure-induced shut-off valve 110 via port 221. If air actuator piston 230 is in the "down" position, plunger 260 pushes plunger 260A against double diaphragm 270. Double diaphragm 270 is thereby pushed against valve seat 280, positively shutting off liquid flow from inlet port 221 to channel 220 and defeating the back pressure regulator function. If air actuator piston 230 is in the "up" position, spring 250 causes plunger 260A to apply a constant force on double diaphragm 270. If the pressure at inlet port 221 exceeds a certain value (a function of the design of the spring, diaphragm, etc.) double diaphragm 270 opens slightly and allows liquid to flow past seat 280 into channel 220. Further increases in pressure result in further opening of double diaphragm 270 so as to keep the upstream line pressure nearly constant. Spring 250, double diaphragm 270 and seat 280 can be chosen such that pressure-induced shut-off valve 110 or 111 has a steep "pressure v. flow" response curve with a small hysteresis.

Figure 3:
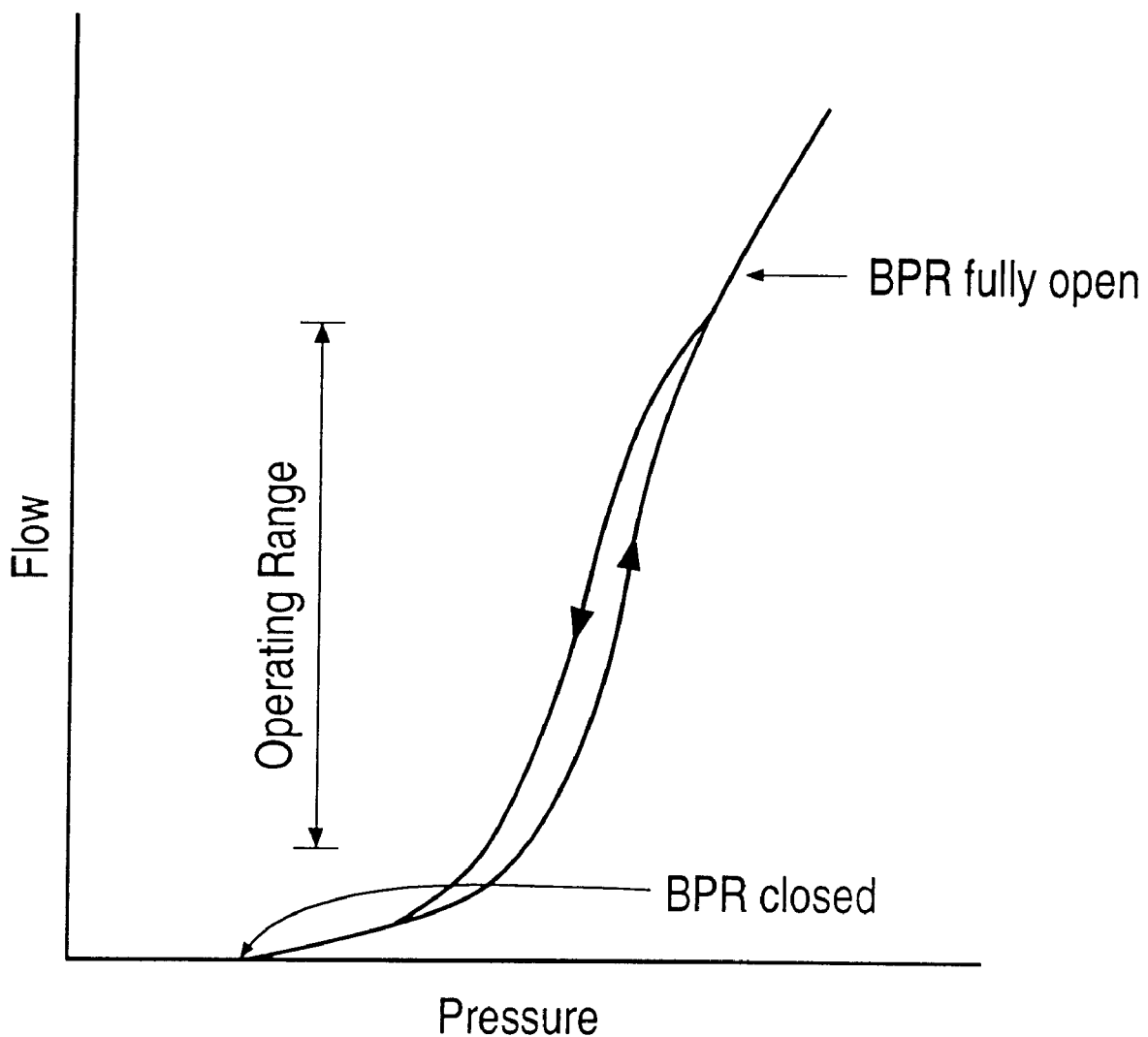
FIG. 3 shows a "pressure v. flow" curve for a typical back pressure regulator.

FIG. 3 shows a "pressure v. flow" curve for a typical back pressure regulator. If air actuator piston 230 is in the "up" position, the monoblock valve will function as a back pressure regulator by keeping the inlet pressure at a constant value almost independent of flow and outlet pressure. Back pressure is adjusted to the system operating pressure by using externally threaded set screw 240 to set the force exerted by spring 250 on plunger 260A. Bonnet nut 232 is unscrewed to allow access to set screw 240.

A controlled flow of liquid enters nebulizer/vaporizer 289 through channel 220, and exits through cross bored hole 290, which can have an extremely low volume, typically 1–10 μl. Carrier gas flowing through cross bored hole 290 nebulizes and vaporizes the liquid stream entering via channel 220 to yield a mixture of vapor and gas at the outlet (not shown, positioned collinear with cross bored hole 290) of pressure-induced shut-off valve 110. The mixture of vapor and gas can be introduced into a chemical reactor, such as, for example, an LPCVD system.

Vaporization can be enhanced by heating valve body 210 or entire pressure-induced shut-off valve 110. Alternatively, insert 209 having a large surface area to volume ratio (for example, insert 209 may be a sintered metal filter or a fine mesh screen) may be incorporated into pressure-induced shut-off valve 110 as shown in FIG. 2C. Insert 209 serves to enlarge the gas-liquid phase boundary surface area to provide for improved mass and heat transfer between the gas and liquid phase.

FIG. 2D shows an exploded view of pressure-induced shut-off valve 111 in accordance with another embodiment of this invention. Pressure-induced shut-off valve 111 differs from pressure-induced shut-off valve 110 primarily in that valve body 210 is replaced by valve body 211 and air actuator 231. Pressure-induced shut-off valve 111 has an integrated purge valve but does not include an integrated nebulizer/vaporizer. In this embodiment, nebulizer/vaporizer 190 is positioned downstream of pressure-induced shut-off valve 111 as shown in FIG. 1B. Two head monoblock valve 116 (see FIGS. 2A and 2B) is modified as shown in FIG. 2D to make pressure-induced shut-off valve 111. For the modification of two head monoblock valve 116, bonnet nut 232 is unscrewed and button 262 and double diaphragm 270 are removed. Metal casing 222 is attached to valve body 211 via bonnet nut 232a. Plunger 260 and spring 250 are inserted into metal casing 222 as shown in FIG. 2D. Button 262 fits into cup 263 at the end of plunger 260. Double diaphragm 270 is positioned between valve body 211 and plunger 260. In one embodiment, button 262 and double diaphragm 270 are replaced with new button 262 and new double diaphragm 270.

Referring still to FIG. 2D, anti-rotation guide 241 is inserted into bore 243 which is milled into metal casing 222. Typically, metal casing 222 is made of stainless steel. Externally threaded set screw 240 is screwed into threaded portion 243 of metal casing 222 to hold anti-rotation guide 241 in place. Anti-rotation guide 241 has a side hole to receive key 241a. Key 241a fits into channel 243a to prevent rotation of anti-rotation guide 241. Anti-rotation guide 241 attaches to one end of spring 250 to prevent spring 250 from rotating. Spring 250 and plunger 260A are installed into metal casing 222 and brass clamp ring 261 is installed around plunger 260. Using bonnet nut 232, air actuator 233 is screwed onto the lower end of metal casing 222 (see FIG. 2D). Externally threaded set screw 240 is used to adjust the force of spring 250 on plunger 260 to system operating pressure, such as 25 psi in one embodiment, prior to attachment of air actuator 233.

In accordance with an embodiment of this invention, air actuator 233 positively controls the shut-off of liquid flow through pressure-induced shut-off valve 111 by air actuator piston 230 (not shown in FIG. 2D, see FIG. 2C) operating plunger 260. The operation and characteristics for pressure-induced shut-off valve ill are similar to the operation and characteristics of pressure-induced shut-off valve 110 shown in FIG. 2C and are discussed above herein.

In accordance with this embodiment of the invention, air actuator 231 controls the opening and closing of purge valve 108 in valve body 211 of pressure-induced shut-off valve 111. Port 293 in FIG. 2E is the inlet for the purge gas while port 291 is the inlet for the liquid from LFC 120 (see FIG. 1B) and port 292 is the outlet coupled to the reactor chamber. During purging, port 293 and port 292 are enabled by opening air actuator 231 (see FIG. 2D) and closing air actuator 233 (see FIG. 2D) to disable port 291. The purge gas enters pressure-induced shut-off valve 111 through port 293 and flows through seat-to-seat communication line 298 (see FIG. 2E) in valve body 211 to valve seat 280 to completely purge seat 280 and all areas downstream of seat 280. During back pressure regulation mode, liquid enters port 291, crossing valve seat 280 and exiting through port 292.

While an embodiment in accordance with this invention may use elastomer type diaphragms or seats, an embodiment may be all metal. An all metal embodiment allows baking to remove moisture and hydrocarbons, or use at high temperatures for vaporization of low vapor pressure fluids. Elastomers are subject to stretching and weakness from which leakage may result. Elastomers may also not be compatible with some liquids.

The various embodiments of the system described above are merely illustrative and not intended to limit the scope of the invention to the particular embodiments described. In view of this disclosure, many additional and alternative embodiments according to the principles of this invention will be apparent to those skilled in the art.

We claim:

1. A pressure-induced shut-off valve comprising a positive shut-off mechanism for closing off a flow of liquid through said pressure-induced shut-off valve when said positive shut-off mechanism is actuated and a back pressure regulator for automatically maintaining a constant pressure in a region upstream from said valve when said positive shut-off mechanism is not actuated.

2. The pressure-induced shut-off valve as in claim 1 wherein said back pressure regulator comprises:

a diaphragm;

a first seat; and a spring, said spring exerting a substantially constant force on said diaphragm, said diaphragm rising from said first seat if a back pressure exceeds a certain value.

3. The pressure-induced shut-off valve as in claim 2 wherein said positive shut-off mechanism comprises a plunger for causing said diaphragm to press against said first seat when said positive shut-off mechanism is actuated.

4. The pressure-induced shut-off valve as in claim 3 wherein said positive shut-off mechanism further comprises a shut-off valve actuator.

5. The pressure-induced shut-off valve as in claim 4 wherein said shut-off valve actuator causes said plunger to act on said diaphragm.

6. The pressure-induced shut-off valve as in claim 1 wherein said pressure-induced shut-off valve comprises an integrated cross flow nebulizer/vaporizer.

7. The pressure-induced shut-off valve as in claim 2 further comprising a set screw for adjusting the force exerted by said spring on said diaphragm.

8. The pressure-induced shut-off valve as in claim 6 wherein said integrated cross flow nebulizer/vaporizer comprises an insert.

9. The pressure-induced shut-off valve as in claim 8 wherein said insert is a screen.

10. The pressure-induced shut-off valve as in claim 2 further comprising an integrated purge valve.

11. The pressure-induced shut-off valve as in claim 10 wherein said integrated purge valve comprises a second seat which is fluidly coupled to said first seat to allow substantially complete purging of said liquid from said first seat.

12. The pressure-induced shut-off valve as in claim 11 wherein said first seat and said second seat are both metal.

13. The pressure-induced shut-off valve as in claim 4 wherein said shut-off valve actuator is an air actuator.

14. The pressure-induced shut-off valve as in claim 1 wherein said positive shut-off mechanism and said back pressure regulator each comprise a diaphragm and a valve seat, the same diaphragm and the same valve seat being comprised in both the positive shut-off mechanism and the back pressure regulator, respectively, said diaphragm being forced against said valve seat when said shut-off mechanism is actuated, said diaphragm being controlled by a spring member when said shut-off mechanism is not actuated.

15. The pressure-induced shut-off valve as in claim 8 wherein said insert is a sintered metal filter.

16. A combination comprising the pressure-induced shut-off valve of claim 1 fluidly coupled to a liquid line.

17. The combination of claim 16 wherein said liquid line comprises a degas module coupled to and upstream of said pressure-induced shut-off valve.

18. The combination of claim 16 wherein said back pressure regulator comprises:

a diaphragm;

a first seat; and a spring, said spring exerting a substantially constant force on said diaphragm, said diaphragm rising from said first seat if a back pressure in said liquid line upstream of said pressure-induced shut-off valve exceeds a certain value.

19. The combination of claim 18 wherein said positive shut-off mechanism comprises a plunger for causing said diaphragm to press against said first seat when said positive shut-off mechanism is actuated.

20. The combination of claim 19 wherein said positive shut-off mechanism further comprises a shut-off valve actuator.

21. The combination of claim 18 further comprising an integrated purge valve.

22. The combination of claim 21 wherein said integrated purge valve comprises a second seat which is fluidly coupled to said first seat to allow a substantially complete purging of said liquid from said first seat.

* * * * *